(12) United States Patent
Chen

(10) Patent No.: US 6,679,968 B2
(45) Date of Patent: Jan. 20, 2004

(54) LASER LAMINAR STRUCTURE AND METHOD OF MANUFACTURING THE SAME

(75) Inventor: Cheng-Hsiu Chen, Chu-Bei (TW)

(73) Assignee: K Laser Technology, Inc., Hsinchu (TW)

( * ) Notice: Subject to any disclaimer, the term of this patent is extended or adjusted under 35 U.S.C. 154(b) by 16 days.

(21) Appl. No.: 09/909,723

(22) Filed: Jul. 19, 2001

(65) Prior Publication Data

US 2003/0017308 A1 Jan. 23, 2003

(51) Int. Cl.⁷ ............................................... B44C 1/165
(52) U.S. Cl. .................. 156/240; 156/230; 156/233; 156/241; 264/212; 264/241; 264/299; 264/319
(58) Field of Search .................. 156/196, 230, 156/233, 240, 241; 264/212, 241, 319 299, 482

(56) References Cited

U.S. PATENT DOCUMENTS 6,153,038 A * 11/2000 Brooker ...................... 156/230

6,171,429 B1 * 1/2001 Aindow et al. ............. 156/234

* cited by examiner

*Primary Examiner*—Donald J. Loney
(74) *Attorney, Agent, or Firm*—Pro-Techtor International Services

(57) ABSTRACT

A laser laminar structure is formed by coating each side of a thin substrate with a bonding resin layer, and then coating each bonding resin layer with a molding resin layer; attaching a transparent laser film provided with fine grooves of a laser image presenting figure, characters or logos to an outer surface of each molding resin layer, so that each molding resin layer is formed at superficial portion with fine lines corresponding to the fine grooves of the laser image on the laser film; baking the molding resin layers at high temperature to harden the fine lines formed thereon; and releasing the transparent laser films from the molding resin layers to provide a thermostable laser laminar structure.

7 Claims, 6 Drawing Sheets

LASER LAMINAR STRUCTURE AND METHOD OF MANUFACTURING THE SAME

FIELD OF THE INVENTION

The present invention relates to a laser laminar structure and a method of manufacturing the same, and more particularly to a thermostable laser laminar structure and a method of manufacturing the same.

BACKGROUND OF THE INVENTION

A laser aluminum foil is widely employed in decorating product packages and protecting products against counterfeits. The laser aluminum foil has become the best means to distinguish a true product from a counterfeit when the nowaday popular compact discs, laser disks, digital versatile disks, and credit cards are massively counterfeited or illegally reproduced.

The laser aluminum foil known in the art is produced by way of reproducing a laser image from a laser film onto the aluminum foil or directly adhering a laser film to the aluminum foil. The laser aluminum foil can endure a processing temperature up to 230° C. or so. When the laser aluminum foil is subjected to subsequent process that requires a high temperature exceeding 260° C., such as adding metal powder for decoration purpose or polishing baking finish for identifying a true product, fine grooves forming the image on the laser film would be destructed to result in ineffective laser scanning of the laser image and inferior image displaying effect. That is, the conventional laser aluminum foil has only limited scope of application.

SUMMARY OF THE INVENTION

A primary object of the present invention is to provide a laser laminar structure and the method of manufacturing the same, in which a thin substrate is coated with a layer of resin material so as to endure a high temperature exceeding 260° C. required in subsequent processes.

Another object of the present invention is to provide a laser laminar structure and the method of manufacturing the same, in which fine grooves of a laser image could be formed on a resin material coated on a thin substrate without the risk of being destructed due to high temperature to result in the problem of ineffective laser scanning of the laser image.

To achieve the above and other objects, the laser laminar structure of the present invention is formed by coating each side of a thin substrate with a bonding resin layer, and then coating each bonding resin layer with a molding resin layer; attaching a transparent laser film provided with fine grooves of a laser image presenting figure, characters or logos to an outer surface of each molding resin layer, so that each molding resin layer is formed at superficial portion with primary fine lines corresponding to the fine grooves of the laser image on the laser film; baking the molding resin layers at high temperature to harden the primary fine lines formed thereon; and releasing the transparent laser films from the molding resin layers to provide a thermostable laser laminar structure.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
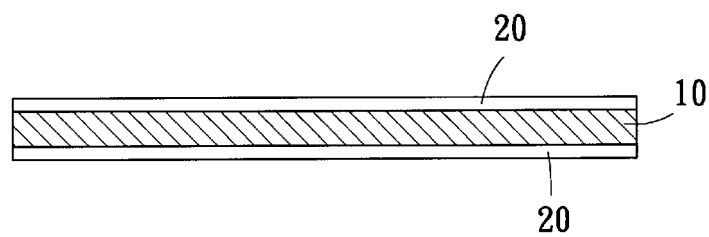
FIG. 1 is a sectional view showing a thin substrate of the laser laminar structure according to a first embodiment of the present invention is coated at each side with a layer of bonding resin material.

Please refer to FIGS. 1 through 8 that show detailed steps for manufacturing a laser laminar structure according to a first embodiment of the present invention. A thin substrate 10 made of aluminum foil, sheet metal or sheet plastics forms a basic material of the laser laminar structure. Two sides of the thin substrate 10 are separately coated with a type of bonding resin material to form two bonding resin layers 20, as shown in FIG. 1. The bonding resin material may be in any form and may be an oil-based or a water-based resin, a main function of which is to serve as a bonding interface between the thin substrate 10 and other materials. The bonding resin layers 20 are subjected to heat drying immediately after they are applied on two sides of the substrate 10.

Figure 2:
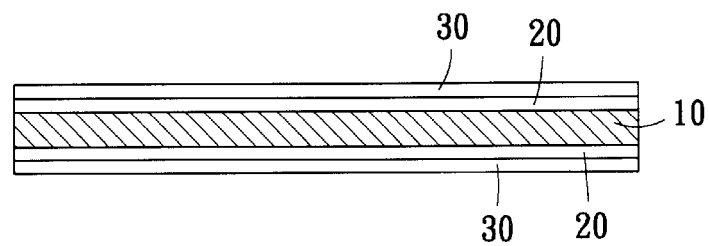
FIG. 2 is a sectional view showing the substrate coated with bonding resin material as shown in FIG. 1 is coated at an outer surface of each bonding resin layer with a layer of molding resin material.

After the bonding resin layers 20 are heat-dried, they are coated at outer surfaces with a type of molding resin material to form two molding resin layers 30, as shown in FIG. 2. The molding resin material may be in any form and of any resin material. The molding resin layers 30 must have plane and smooth outer surfaces and maintain in a wet and colloidal state when they are initially applied on the bonding resin layers 20.

Figure 3:
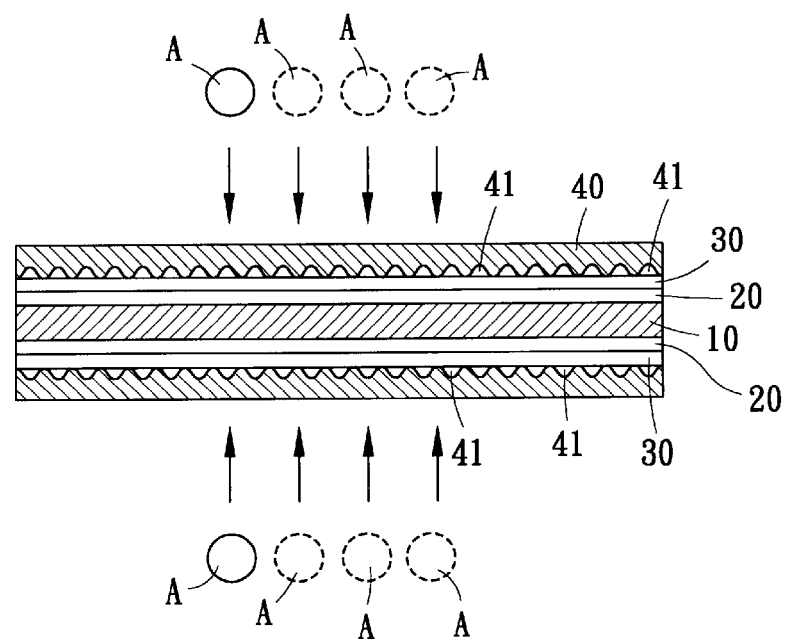
FIG. 3 is a sectional view showing a transparent laser film is attached to an outer surface of each molding resin layer coated on the thin substrate in FIG. 2, and the molding resin layers are then subjected to baking at high temperature.
Figure 4:
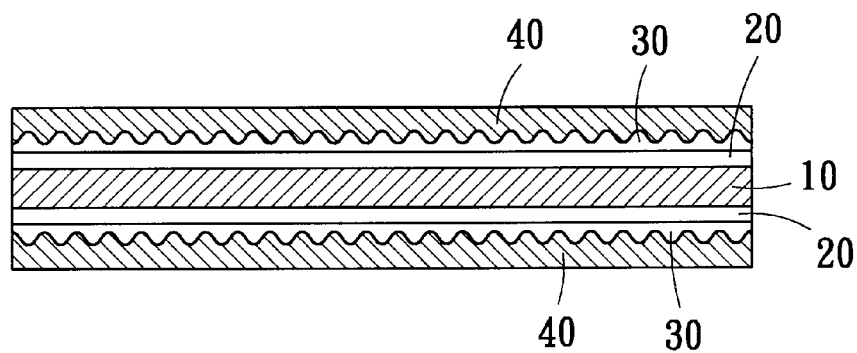
FIG. 4 is a sectional view showing the molding resin layers of the thin substrate of FIG. 3 are formed at outer surfaces with fine lines corresponding to fine grooves of laser image on the laser film after being baked and hardened at high temperature.

A transparent laser film 40 is then attached to an outer surface of each molding resin layer 30, as shown in FIG. 3. An inherent bonding property of the molding resin layers 30 enables the laser films 40 to directly adhere to the outer surfaces of the two molding resin layers 30. Each transparent laser film 40 is provided with a laser-processed image containing a plurality of fine grooves 41 to show desired figures, characters or logos. For the purpose of simplicity, the transparent laser film 40 having the laser-processed image will be referred to as "the laser film 40" hereinafter. Due to a surface tension and the inherent bonging property of the molding resin material, a superficial portion of each molding resin layer 30 completely enters into the fine grooves 41 on the laser film 40 attached to the outer surface of the molding resin layer 30, so that a plurality of primary fine lines 31 are formed on the outer surface of each molding resin layer 30 corresponding to the fine grooves 41 on the laser film 40, as shown in FIG. 5.

Figure 5:
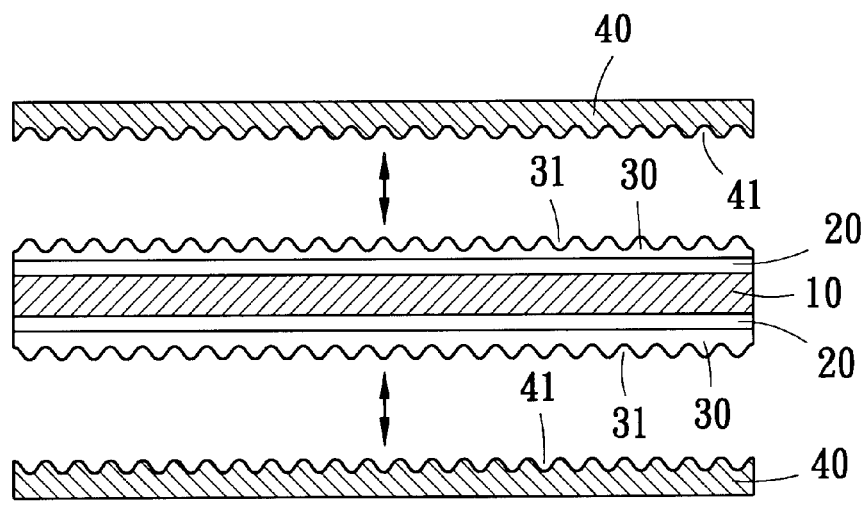
FIG. 5 is a sectional view showing the transparent laser films are released from the hardened molding resin layers of FIG. 4.

After the laser films 40 are attached to outer surfaces of the molding resin layers 30, the molding resin layers 30 are subjected to a penetrating baking process by using ultraviolet baking equipment A, as shown in FIG. 3, so that the molding resin layers 30 are hardened and have a fixed superficial contour, as shown in FIG. 5.

Figure 6:
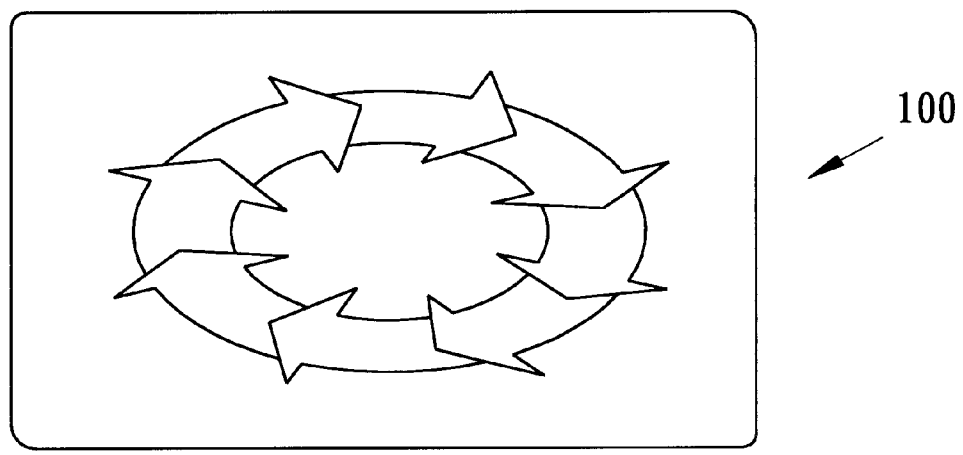
FIG. 6 shows a finished product of the laser laminar structure according to the first embodiment of the present invention, in which laser images on the laser films have been reproduced onto the molding resin layers at two sides of the laminar structure.

After the molding resin layers 30 are hardened, the laser films 40 are released from the molding resin layers 30 to expose the fine lines 31 on the outer surfaces of the molding resin layers 30. As mentioned above, the fine lines 30 correspond to the fine grooves of laser images on the laser films 40 and therefore present the same images shown on the transparent laser films 40. A product obtained at this stage is a laser laminar structure according to the first embodiment of the present invention and is denoted with a reference numeral of 100, as shown in FIG. 6. Since the molding resin layers 30 are thermostable at high temperature, the laser laminar structure 100 may endure a high temperature exceeding 260° C. in subsequent manufacturing processes, such as forming a metal powder coating or polishing a baking paint finish, without causing damages to the fine lines 31 on outer surfaces of the product 100. The problem of ineffective laser scanning of laser image due to destructed fine lines 31 can therefore be eliminated.

Figure 7:
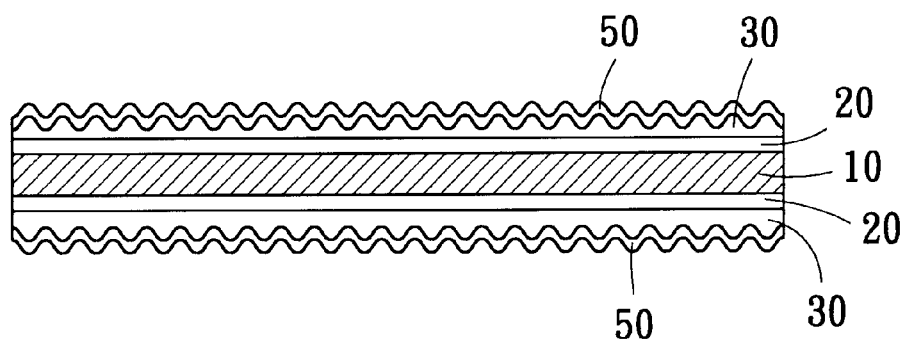
FIG. 7 is a sectional view showing a thin metal layer is formed on each molding resin layer of FIGS. 5 and 6 through metallizing by evaporation to cover the laser image fine lins formed on the molding resin layer.

For the laser laminar structure 100 of the present invention to provide upgraded laser image effect and to have well protected outer surfaces, two thin metal layers 50 are formed on the molding resin layers 30 over the fine lines 31 through metallizing by evaporation, as shown in FIG. 7. The thin metal layers 50 have outer contours identical to that of the fine lines 31. The thin metal layers 50 may be formed from any suitable metal material. In a preferred embodiment of the present invention, the thin metal layers 50 are formed of aluminum. Other suitable materials include, but not limited to, zinc sulfide and silica that could be coated on the outer surfaces of the molding resin layers 30 having the fine lines 31 through, for example, transparent plating to upgrade the laser image effect.

Figure 8:
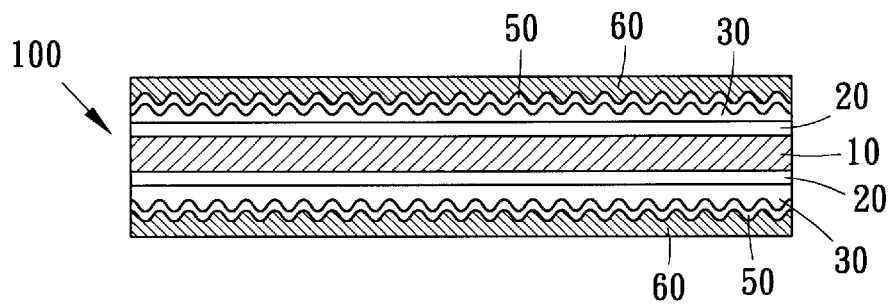
FIG. 8 is a sectional view showing each thin metal layer of FIG. 7 is covered at an outer surface with a surface-protecting layer.

The thin metal layers 50 may be further coated with surface-protecting layers 60, as shown in FIG. 8. The surface-protecting layers 60 may be formed from a material the same as that for the molding resin layers 30, or a general heat-dried type of surface protecting resin. The surface-protecting layers 60 coating the thin metal layers 50 provide two smooth and plane outer surfaces and are subjected to baking with the baking equipment A, so that the surface-protecting layers 60 is hardened into transparent solid layers to protect the product 100 and enable the same to be thermostable at high temperature.

From the above description of manufacturing steps for forming the laser laminar structure 100 of the present invention, it can be seen that the laser laminar structure 100 is thermostable at high temperature that enables the product 100 to endure high-temperature processing environments required in different subsequent processes of the product 100, and to avoid the problem of ineffective laser scanning of the laser image formed on the product 100.

Figure 9:
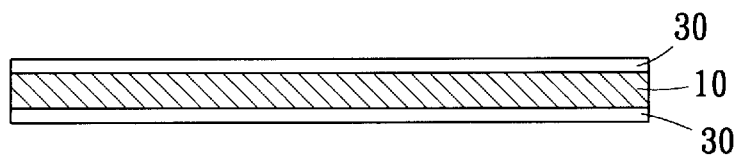
FIG. 9 is a sectional view showing a thin substrate of the laser laminar structure according to a second embodiment of the present invention is coated at each side with a layer of molding resin material.
Figure 10:
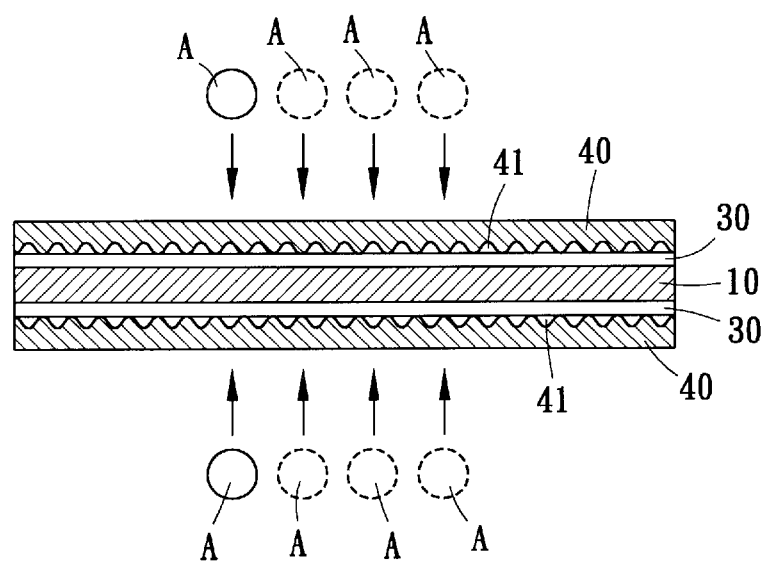
FIG. 10 is a sectional view showing a transparent laser film is attached to an outer surface of each molding resin layer of the thin substrate of FIG. 9, and the molding resin layers are then subjected to baking at high temperature.
Figure 11:
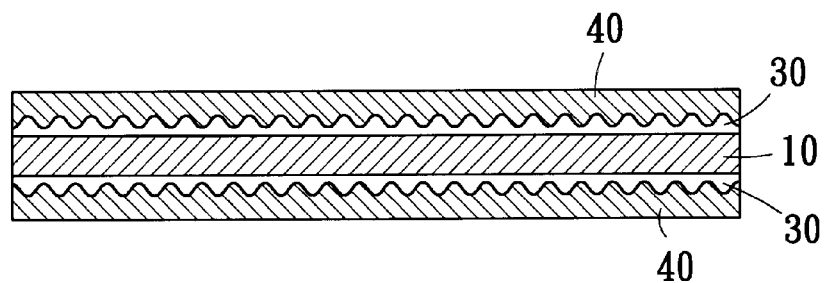
FIG. 11 is a sectional view showing the molding resin layers of the thin substrate of FIG. 10 are formed at outer surfaces with fine lines corresponding to fine grooves of laser images on the laser film after being baked and hardened at high temperature.

FIGS. 9 through 15 show detailed steps for manufacturing a laser laminar structure according to a second embodiment of the present invention. This second embodiment is different from the first embodiment in that the thin substrate 10 made of aluminum foil shown in FIG. 9 is directly coated at two sides with the molding resin material to form two molding resin layers 30 and the bonding resin layers 20 in the first embodiment are omitted in the second embodiment. Due to an inherent bonding property of the molding resin material, the molding resin layers 30 are directly bonded to two sides of the thin substrate 10. In FIG. 10, it is shown that transparent laser films 40 are directly attached to the molding resin layers 30, so that fine grooves 41 on the laser films 40 are fitly in contact with outer surfaces of the molding resin layers 30, allowing molding resin material at superficial portions of the molding resin layers 30 to fully enter the fine grooves 41 and thereby form fine lines 31 on the outer surfaces of the molding resin layers 30 corresponding to laser images on the laser films 40.

Figure 12:
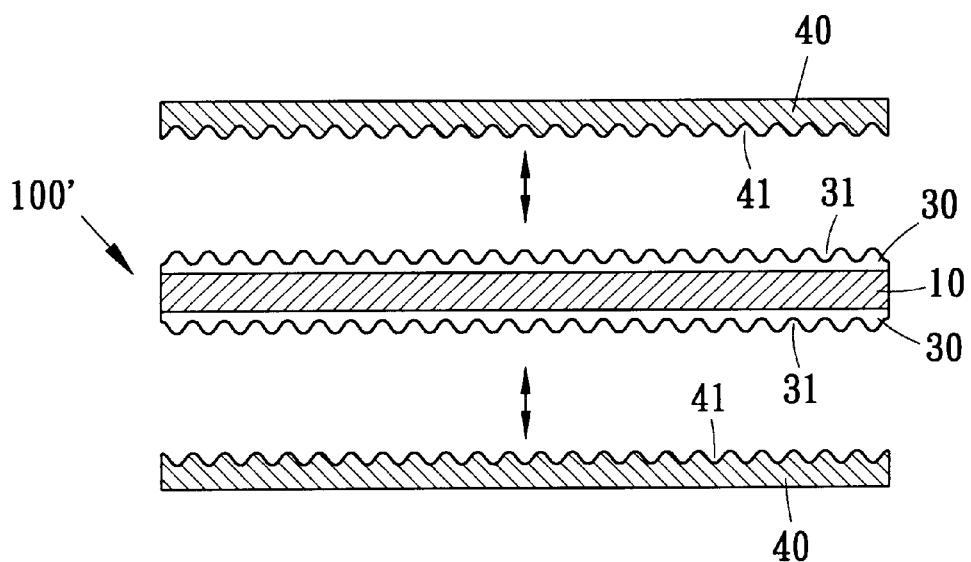
FIG. 12 is a sectional view showing the transparent laser films are released from the hardened molding resin layers of FIG. 11.

As in the first embodiment, after the laser films 40 are attached to outer surfaces of the molding resin layers 30, the molding resin layers 30 at two sides of the thin substrate 10 are subjected to a penetrating baking process using the ultraviolet baking equipment A, as shown in FIG. 10, so that the molding resin layers 30 are hardened and the fine lines 31 form a fixed superficial contour corresponding to the fine grooves 41, as shown in FIG. 12.

Figure 13:
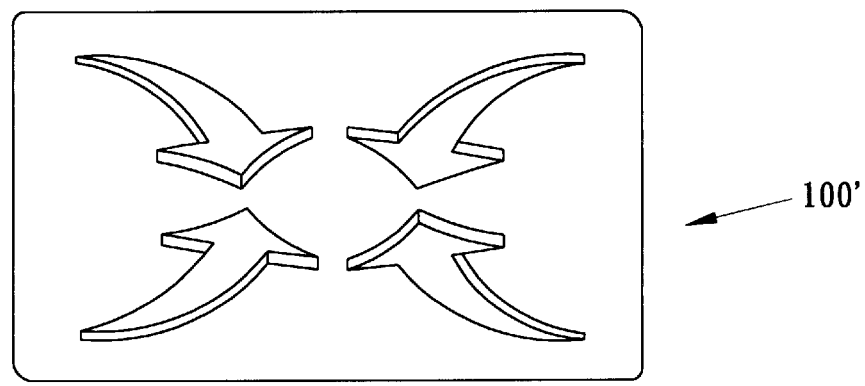
FIG. 13 shows a finished product of the laser laminar structure according to the second embodiment of the present invention, in which the laser images on the laser films have been reproduced onto the molding resin layers at two sides of the laminar structure.

After the molding resin layers 30 are hardened, the laser films 40 are released from the molding resin layers 30 to expose the fine lines 31 on the outer surfaces of the molding resin layers 30. As mentioned above, the fine lines 30 correspond to the fine grooves of laser images on the laser films 40 and therefore present the same images shown on the transparent laser films 40. A product obtained at this stage is a laser laminar structure according to the second embodiment of the present invention and is denoted with a reference numeral of 100', as shown in FIG. 12. FIG. 13 illustrates the product 100' has images provided at two sides and the images are identical to that on the laser films 40.

The laser laminar structure 100' has an overall thickness smaller than that of the laser laminar structure 100 and is suitable for use at occasions where a small thickness is an important factor to be considered.

Figure 14:
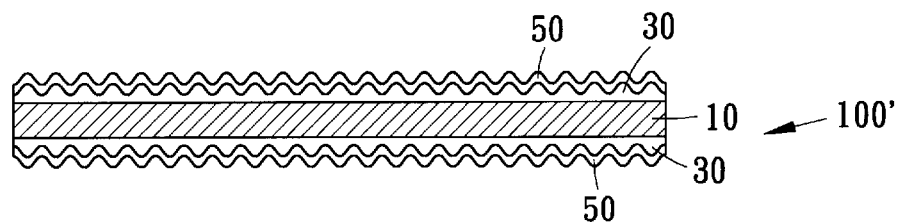
FIG. 14 is a sectional view showing a thin metal layer is formed on each molding resin layer of FIGS. 12 and 13 through metallizing by evaporation to cover the laser image fine lines formed on the molding resin layer.
Figure 15:
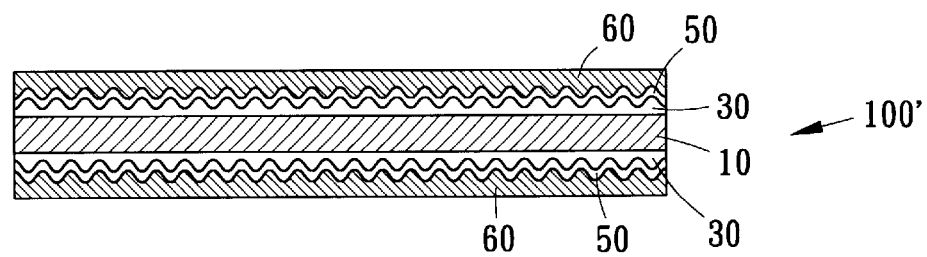
FIG. 15 is a sectional view showing each thin metal layer of FIG. 14 is covered at an outer surface with a surface-protecting layer.

FIG. 14 shows thin metal layers 50 are formed on the fine lines 31 of the two molding resin layers 30 of the laser laminar structure 100' through metallizing by evaporation, and FIG. 15 shows the laser laminar structure 100' is further coated with surface-protecting layers 60 on the thin metal layers 50. The thin metal layers 50 and the surface-protecting layers 60 enable the fine lines 31 to present the laser images in an even better effect, and enable the overall laser laminar structure 100' to have well-protected outer surfaces and good ability of enduring high-temperature processes.

The spirit of the present invention is to provide simple, convenient and economical manufacturing methods to produce simple-structured laser laminar structures that have good ability of enduring high temperature in subsequent processing of the laser laminar structures.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A method of manufacturing a laser laminar structure, comprising steps of:

using a molding resin material to coat at least one of two sides of a thin substrate to form a molding resin layer, so that said molding resin layer is bonded to said thin substrate;

attaching a transparent laser film to an outer surface of said molding resin layer, and said transparent laser film being provided with a laser-processed image containing a plurality of fine grooves to show desired figures, characters or logos;

allowing said molding resin material at a superficial portion of said molding resin layer to enter said fine grooves on said transparent laser film through inherent surface tension and bonding ability of said molding resin material, so that primary fine lines corresponding to said fine grooves are formed on said outer surface of said molding resin layer to present a laser image corresponding to said image provided on said transparent laser film;

subjecting said molding resin layer to baking at high temperature, so that said primary fine lines on said outer surface of said molding resin layer are hardened into a fixed superficial contour; and releasing said transparent laser film from said molding resin layer to provide a laser laminar structure that is capable of enduring high temperature required in subsequent processing of said laser laminar structure.

2. The method of manufacturing a laser laminar structure as claimed in claim 1, further comprises a step of applying a bonding resin material over said one of two sides of said thin substrate before said side of said thin substrate is coated with said molding resin layer.

3. The method of manufacturing a laser laminar structure as claimed in claim 2, wherein said thin substrate being coated with said bonding resin layer is subjected to heat drying process to harden said boding resin layer before being coated with said molding resin layer.

4. The method of manufacturing a laser laminar structure as claimed in claim 1, further comprises a step of forming a thin metal layer over said fine lines on said superficial portion of said molding resin layer through metallizing by evaporation.

5. The method of manufacturing a laser laminar structure as claimed in claim 4, further comprises a step of forming a surface-protecting layer on said thin metal layer.

6. The method of manufacturing a laser laminar structure as claimed in claim 5, wherein said step of forming said surface-protecting layer includes applying a molding resin material or a general surface coating resin material over said thin metal layer to form a plane and smooth outer surface, and subjecting said plane and smooth outer surface to baking, so as to form a hardened, transparent and solid surface-protecting layer.

7. The method of manufacturing a laser laminar structure as claimed in claim 1, wherein said thin substrate is made of a material selected from the group consisting of aluminum foil, sheet metal, and sheet plastics.

* * * * *